(12) United States Patent
Jin

(10) Patent No.: US 7,647,953 B2
(45) Date of Patent: Jan. 19, 2010

(54) UNSPENT AUTOMOTIVE FLUID RECOVERY SYSTEM

(76) Inventor: Gang Jin, 10439 N. Stelling Rd., Cupertino, CA (US) 95014

( * ) Notice: Subject to any disclaimer, the term of this patent is extended or adjusted under 35 U.S.C. 154(b) by 330 days.

(21) Appl. No.: 11/521,538

(22) Filed: Sep. 15, 2006

(65) Prior Publication Data

US 2008/0066823 A1    Mar. 20, 2008

(51) Int. Cl.
*B65B 1/04* (2006.01)
*B65D 1/24* (2006.01)

(52) U.S. Cl. .............................. 141/86; 141/9; 220/500; 220/525

(58) Field of Classification Search ...................... 141/2, 141/9, 86, 106; 137/312–314; 220/500, 220/502, 523–525
See application file for complete search history.

(56) References Cited

U.S. PATENT DOCUMENTS

| | | | | |
|---|---|---|---|---|
| 2,133,770 A | * | 10/1938 | Mcglohon | 141/364 |
| 2,176,367 A | * | 10/1939 | Stough | 220/324 |
| 2,182,681 A | * | 12/1939 | Seibel | 73/53.01 |
| 4,359,075 A | * | 11/1982 | Eberle et al. | 141/177 |
| 4,378,026 A | * | 3/1983 | Bauer | 137/205 |
| 4,457,349 A | * | 7/1984 | Vazin | 141/86 |
| 5,056,621 A | * | 10/1991 | Trevino | 184/1.5 |
| 5,062,500 A | * | 11/1991 | Miller et al. | 184/106 |
| 5,168,959 A | * | 12/1992 | Davis | 184/1.5 |
| 5,269,354 A | * | 12/1993 | Koberg | 141/106 |
| 5,375,703 A | * | 12/1994 | Deuber | 206/223 |
| 5,477,897 A | * | 12/1995 | Scofield | 141/105 |
| 5,540,264 A | * | 7/1996 | Harp | 141/106 |
| 5,647,414 A | * | 7/1997 | Brittain et al. | 141/231 |
| 6,109,313 A | * | 8/2000 | Phelps | 141/106 |
| 7,040,357 B1 | * | 5/2006 | Volkers et al. | 141/86 |
| 7,431,056 B1 | * | 10/2008 | Smith | 141/86 |

* cited by examiner

*Primary Examiner*—Timothy L Maust
(74) *Attorney, Agent, or Firm*—Schein & Cai LLP; James (Jingming) Cai

(57) ABSTRACT

A system for reclaiming residual unspent automotive fluid having a fluid receiver which seats open containers of the automotive fluid in an inverted orientation to allow influences of gravity to self-drain the open containers. The fluid receiver accumulates the residual unspent automotive fluid into classifying compartments. Each compartment can be individually pumped or drained of the accumulated and stored residual automotive fluid.

14 Claims, 1 Drawing Sheet

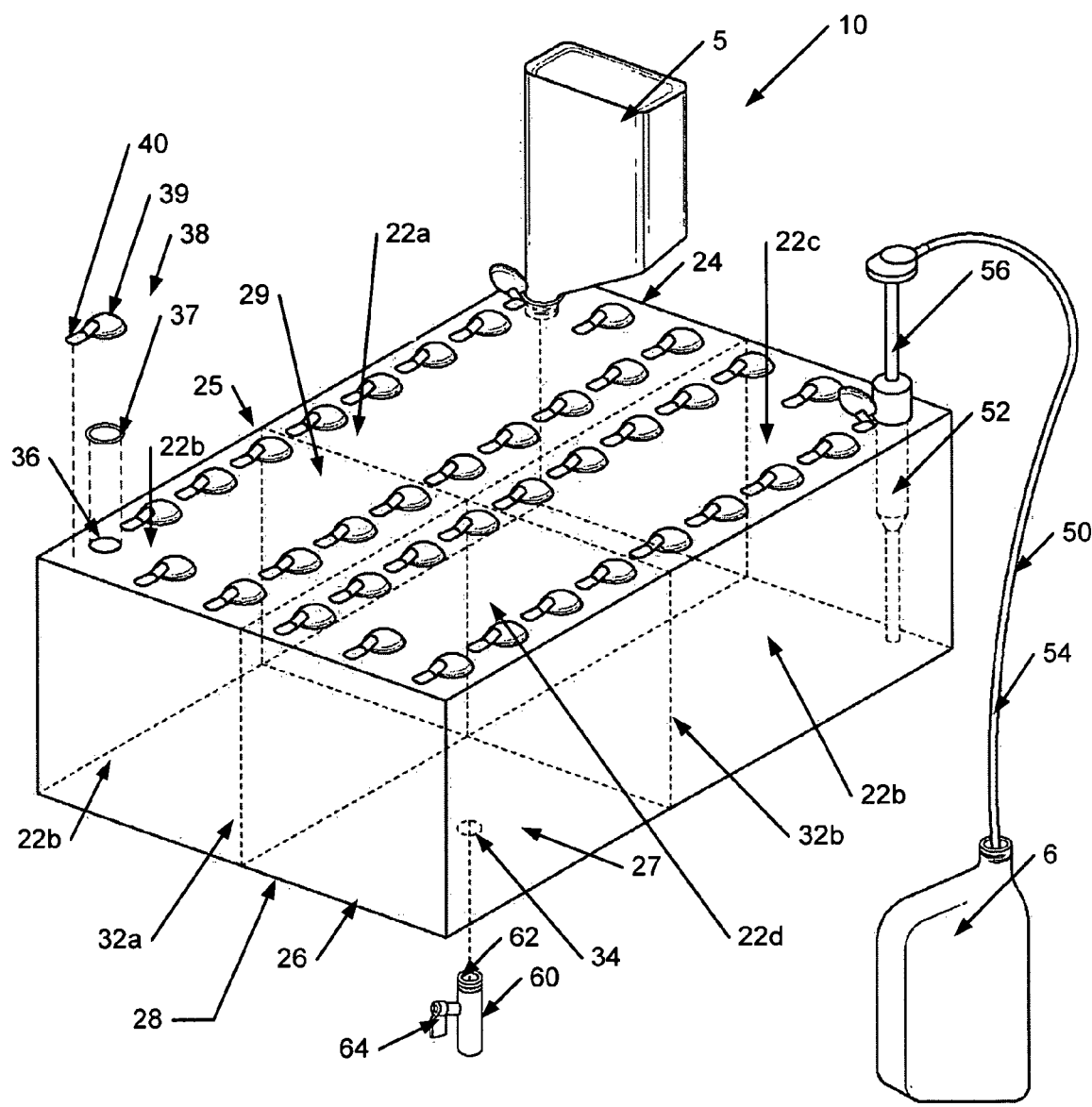

UNSPENT AUTOMOTIVE FLUID RECOVERY SYSTEM

BACKGROUND OF THE INVENTION

1. Field of the Invention

The present invention relates to fluid recovery devices and, more particularly, to an unspent automotive fluid recovery system which recovers unused automotive fluids (e.g. motor oils and automatic transmission fluids).

2. General Background

Conservation, reclamation and recycling of used motor oil has been mandated by states and the federal government. The recycling of used motor oil reduces environmental hazards caused by the waste byproduct of used motor oil. Thus, processes have been created to reclaim and recycle the used motor oil so that it can be profitable to the recycler and/or provide an energy source.

After, the spent motor oil has been drained from an engine, the spent motor oil can be taken to a collection center so that it can be recycled such as into electricity. Furthermore, recycled motor oil can be used in furnaces for heat or in power plants to generate electricity for homes, schools, and businesses. Moreover, the spent motor oil can also be sent to a refinery that specializes in processing used oil and re-refined into lubricating base oils that can be used to formulate engine oils.

For example, two-gallons of recycled motor oil can be used to generate enough electricity for almost 24 hours to a residence. As can be readily seen, there are significant advantages to recycling motor oil by average citizens by disposing of the spent motor oil at convenient collection sites to keep used motor oil out of waterways and ground water supplies and getting used oil into the recycling system. Many automotive centers recycle the used motor oil through a complex system to reclaim motor oil in the center.

State and federal agencies have set regulations for the handling and disposal of used motor oil. The Environmental Protection Agency (EPA) has also issued its own used oil management standards, and state regulatory authorities are required to implement them.

While much attention has been directed to reclaiming used motor oil, an estimated 30 million quarts of unspent motor oil is lost as the result of 1-2% of residual motor oil left in an open container of motor oil. This unclaimed unspent motor oil can provide a source of environmental contamination and a monetary loss.

In view of the above, there is a continuing need for an unspent automotive fluid recovery system that allows one or more open containers to be seated in a fluid receiver in a manner that allows residual motor oil or other automotive fluid to be drained into a storage compartment automatically under the influence of gravity without the need for a mechanic or user to waste time holding the containers and wait for the residual to completely evacuate the containers.

There is a further continuing need for an unspent automotive fluid recovery system that includes a plurality of classifying compartments for storing the evacuated residual automotive fluids of like kind and weight into a designated classifying compartment. The accumulation of a residual automotive fluid can be pumped or siphoned from the classifying compartment for later use, repackaging or recycling with spent automotive fluids.

SUMMARY OF THE PRESENT INVENTION

The preferred embodiment of unspent automotive fluid recovery system of the present invention solves the aforementioned problems in a straight forward and simple manner.

In view of the above objects, it is a feature of the present invention to provide an unspent automotive fluid recovery system which is adapted to recover residual (1-2%) automotive fluids left in open containers.

It is a further object of the present invention to provide an unspent automotive fluid recovery system which allows containers to be seated and thereafter left to self-drain under the influence of gravity. After, the automotive fluid has been recovered and accumulated, then the storage compartment can be emptied into new bottle (repackaged) for use.

It is a further object of the present invention to provide an unspent automotive fluid recovery system that allows one or more open containers to be seated in a fluid receiver in a manner that allows residual motor oil or other automotive fluid to be drained into a storage compartment automatically under the influence of gravity without the need for a mechanic or user to waste time holding the containers and wait for the residual to completely evacuate the containers.

There is a further continuing need for an unspent automotive fluid recovery system that includes a plurality of classifying compartments for storing the evacuated residual automotive fluids of like kind and weight into a designated classifying compartment. The accumulation of a residual automotive fluid can be drained, pumped or siphoned from the classifying compartment for later use, repackaging or recycling with spent automotive fluids.

In view of the above objects, the present invention contemplates an unspent automotive fluid recovery system comprising a fluid receiver having classifying compartments operable to capture and store simultaneously unspent residual automotive fluids from open containers.

The fluid receiver further comprises a plurality of spring biased caps for closing the plurality of designated inlet ports in a lid of the fluid receiver. When a neck of the container is received or seated in one inlet port, the associated spring biased cap is operable to automatically apply pressure to the container. The ports provide seats for supporting an inverted open container in a manner that allows the container to self-drain into classifying compartments.

The system may include a fluid removing means or device for draining, pumping, siphoning or removing the accumulated residual fluid out of the classifying compartment.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

The FIGURE illustrates a perspective view of the unspent motor oil recovery system in accordance with the present invention.

DETAILED DESCRIPTION OF THE PREFERRED EMBODIMENT

Referring now to the FIGURE the unspent automotive fluid recovery system in accordance with the present invention is referenced by the numeral 10. The unspent automotive fluid recovery system 10 includes a fluid receiver 20 having classifying compartments 22a, 22b, 22c and 22d operable to capture and store simultaneously unspent residual automotive fluids from open containers 5 of the automotive fluids. The system 10 also includes a fluid removing device 50 operable to pump the stored fluid out of a respective one classifying compartment. In the exemplary embodiment, the fluid removing device 50 is shown pumping fluid from compartment 22c.

In the exemplary embodiment, the first compartment 22a is adapted to receive and accumulate therein 10W30 and/or 10W40 weight motor oil. The second compartment 22b is adapted to receive and accumulate therein 5W20 and/or 5W30 weight motor oil. The third compartment 22c is adapted to receive and accumulate therein 20W50 weight motor oil. The fourth compartment 22d is adapted to receive and accumulate therein Automatic Transmission Fluid (ATF).

The fluid receiver 20 comprises, in general, four side walls 24, 25, 26 and 27, a bottom floor 28 and a lid 29. The interior of the fluid receiver 20 includes two divider walls 32a and 32b where divider wall 32a is perpendicular to side walls 24 and 26 while divider wall 32b is perpendicular is side walls 25 and 27. The divider walls 32a and 32b forms separate classifying compartments wherein a fluid in any one compartment is not permitted to escape into another compartment.

The bottom floor 28 has a plurality of bottom floor portions, each floor portion corresponding to a corresponding classifying compartment 22a, 22b, 22c and 22d. In the exemplary embodiment, an outlet or drain 34 is formed in a center of the floor portion corresponding to classifying compartment 22d used to store the ATF. The outlet or drain 34 is threaded and has coupled thereto a valve 60 to close off the flow of fluid out from the valve 60. Thus, the AFT (automotive fluid) in the classifying compartment 22d is drained and/or dispensed though outlet 34 via valve 60. On the other hand, the automotive fluid in the classifying compartment 22d can alternately be pumped out via the pump device 50, siphoned or removed. While only one outlet or drain is shown the floor portion in each classifying compartment 22a, 22b, 22c and 22d. may be provided with a separate outlet or drain for removing the stored automotive fluid. Thus, the outlet or drain serves as a fluid removing means. Nevertheless, other means of removing fluid can be used.

The valve 60 includes a top threaded end 62 adapted to be mated with the outlet 34. The value 60 also includes a fluid control 64 to control the flow of fluid through the valve 60.

The lid 29 comprises a plurality of designated inlet ports 36 wherein each classifying compartment has associated therewith at least one designated inlet port. The fluid receiver further comprises a plurality of spring biased caps 38 for closing the plurality of designated inlet ports 36 and when a neck of the container 5 is received in one inlet port, the associated spring biased cap 38 being operable to automatically apply pressure to and tilt the container 5.

In the exemplary embodiment, each classifying compartment has associated therewith a respective one set of designated inlet ports. Thus, for classifying compartment 22a, a set of eleven (11) designated inlet ports 36 are arranged in the lid 29. Thus, for classifying compartment 22c, a set of eleven (11) designated inlet ports 36 are arranged in the lid 29. However, for each of the classifying compartments 22b and 22d, a set of nine (9) designated inlet ports 36 and a set of nine (9) designated inlet ports 36 are arranged in the lid 29. Each inlet port has associated therewith an O-ring 37.

Each spring biased cap 38 includes a cap member 39 and a spring member 40. For example, a resilient metal arm (spring member 40) has one end affixed to the cap member 39. The resilient metal arm has another end (opposite the one end) attached to lid 29.

In operation, after opening container 5 with an automotive fluid such as motor oil, 1-2% (residual) of the automotive fluid is left in the container 5. The arrangement and construction of the fluid receiver 20 allow necks of a plurality of containers of a single automotive type to be seated in the inlet ports associated with a respective one classifying compartment so that the containers are left to self drain under the influence of gravity to reclaim the residual automotive fluid from an open container.

An oil change may require four (4) or (5) quarts of motor oil. Thus, the mechanic can seat the necks of the containers 5 in the set of inlet ports 36 associated with a respective one classifying compartment 22a. Thus, residual motor oil from the four (4) or (5) quarts can be left to self drain under the influence of gravity simultaneously.

As can be readily seen, four (4) or (5) quarts of motor oil of another weight can be seated in another set of inlet ports 36 associated with a second classifying compartment 22b, 22c or 22d. Thus, residual motor oil from these four (4) or (5) quarts can be left to self drain under the influence of gravity, simultaneously. This process can continue until the capacity of any one classifying compartment 22a, 22b, 22c or 22d is or is nearly reached. Thereafter, the accumulated automotive fluid stored in the classifying compartment can be drained.

The pump device 50 comprises a nipple 52 dimensioned to be received in any one inlet port of the plurality of designated inlet ports and extends in the associated classifying compartment. As shown, the nipple 52 is journalled in inlet port 36 and extends downward so that the opening into the nipple 52 is in close proximity to the bottom floor 28. The pump device 50 further comprises a tubular member 54 coupled to a pump mechanism 56 which is operable to draw fluid through the nipple 52, through the pump mechanism 56 and out to the tubular member 58. The fluid is allowed to flow out of the tubular member 54 to another container 6 for repacking or use. Instead of the pump device 50, each compartment 22a, 22b, 22c and 22d may have a corresponding drain or outlet with a plug (not shown) to permit the stored fluid to drain and removed.

In view of the above, the unspent automotive fluid recovery system serves as a means of ecological conversation to reclaim residual unspent automotive fluid in an expeditious manner. Time is saved while the automotive fluid is recovered since the fluid receiver 20 allows one or more open containers 5 to be seated in a manner that allows the residual automotive fluid to be drained into a classifying compartment 22a, 22b, 22c or 22d automatically under the influence of gravity without the need for a mechanic or user to waste time holding the containers 5 and waiting for the residual automotive fluid to completely evacuate the containers 5. More specifically, the inlet ports 36 provide a seat for the open container 5 to be seated and supported in an inverted orientation, the inverted orientation allows the container to self-drain under the influence of gravity.

The unspent automotive fluid recovery system 10 includes a plurality of classifying compartments 22a, 22b, 22c and 22d for storing the evacuated residual automotive fluids of like kind and weight into a designated classifying compartment. Nevertheless, the fluid receiver 20 may be designed to have only one compartment. However, multiple fluid receivers 20 may be required. The accumulation of the residual automotive fluid can be pumped or siphoned by the pump device 50 from the classifying compartment for later use, repackaging or recycling with spent automotive fluids.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the, invention in various embodiments and with various modifications as are suited to the particular use contemplated. It is intended that the scope of the invention be defined by the claims appended hereto, and their equivalents.

What is claimed as invention is:

1. An unspent automotive fluid recovery system comprising:
   a fluid receiver having classifying compartments operable to capture and store simultaneously unspent residual automotive fluids from open containers;
   the fluid receiver comprises four sides, a bottom floor, a lid and dividing walls for dividing the fluid receiver into the classifying compartments;
   the lid comprises a plurality of designated inlet ports wherein each classifying compartment has associated therewith at least one designated inlet port;
   further comprising a pump device, the pump device comprises a nipple dimensioned to be received in any one inlet port of the plurality of designated inlet ports;
   a tubular member and a pump mechanism which is operable to draw the accumulated residual automotive fluid through the nipple, through the pump mechanism and out of the tubular member; wherein the bottom floor has a plurality of bottom floor portions, each floor portion corresponding to a corresponding classifying compartment; and an outlet formed in at least one floor portion.

2. The system of claim 1, wherein the unspent automotive fluids comprise motor oil and automatic transmission fluid.

3. The system of claim 1, further comprising a valve coupled to the outlet for dispensing automotive fluid from the corresponding classifying compartment.

4. The system of claim 1, wherein the fluid receiver further comprises a plurality of spring biased caps for closing the plurality of designated inlet ports and when a neck of the container is received in one inlet port, the associated spring biased cap being operable to automatically apply pressure to the container.

5. The system of claim 1, wherein the lid comprises a plurality of sets of designated inlet ports wherein each classifying compartment has associated therewith a respective one set of designated inlet ports.

6. An unspent automotive fluid recovery system comprising:
   receiving means for receiving and storing simultaneously residual unspent automotive fluids from open containers having the residual unspent automotive fluids to form accumulated classified automotive fluids;
   fluid removing means for removing an accumulated classified automotive fluid out of the receiving means;
   the receiving means comprises means for dividing an area in the receiving means into separate classifying compartments;
   the receiving means comprises seating means for seating the open containers in an inverted orientation, the inverted orientation allowing gravity to cause self-draining of the residual unspent automotive fluids, the receiving means further comprising a bottom floor having a plurality of bottom floor portions with each floor portion corresponding to a corresponding classifying compartment, and the fluid removing means comprises an outlet formed in at least one floor portion;
   a fluid receiving means comprises a pumping means for pumping the accumulated classified automotive fluid out of the receiving means; and
   the pumping means comprises a nipple dimensioned to be received in the seating means, a tubular member and a pump mechanism which is operable to draw the accumulated classified automotive fluid through the nipple, through the pump mechanism and out of the tubular member.

7. The system of claim 6, wherein the residual unspent automotive fluids comprise motor oil and automatic transmission fluid.

8. The system of claim 6, further comprising fluid controlling means, coupled to the outlet, for controlling draining of the accumulated classified automotive fluid therefrom.

9. The system of claim 6, wherein the receiving means further comprises closing means for closing the seating means, the closing means being spring biased to a closed position, and for applying pressure to a respective one open container while in the seating means.

10. The system of claim 6, wherein the seating means comprises a plurality of sets of designated inlet ports wherein each classifying compartment has associated therewith a respective one set of designated inlet ports.

11. The system of claim 6, wherein the residual unspent automotive fluids comprise motor oil of different weights.

12. The system of claim 6, wherein the residual unspent automotive fluids comprise motor oil.

13. A method of reclaiming residual unspent automotive fluid comprising the steps of:
    seating a plurality of open containers in an inverted orientation in a fluid receiver;
    self-draining the plurality of open containers simultaneously of the residual unspent automotive fluid;
    accumulating in a compartment the residual unspent automotive fluid;
    draining the residual unspent automotive fluid from the compartment via a pump mechanism which is operable to draw the accumulated residual automotive fluid through the nipple, through the pump mechanism and out of the tubular member for reclaiming the residual unspent automotive fluid;
    applying spring biased pressure to each open container of the plurality of open containers, during the seating step; and
    automatically closing an inlet port, for seating a respective one open container, with a spring biased cap when the respective one open container is removed.

14. The method of claim 13, further comprising accumulating in the compartment the residual unspent automotive fluid wherein the compartment has a bottom floor with a plurality of bottom floor portions with each floor portion corresponding to a corresponding classifying compartment and draining via the bottom floor having an outlet formed in at least one floor portion.

* * * * *